(12) United States Patent
Biskeborn et al.

(10) Patent No.: US 10,170,139 B2
(45) Date of Patent: *Jan. 1, 2019

(54) MAGNETIC RECORDING HEAD HAVING PROTECTED READER SENSORS AND NEAR ZERO RECESSED WRITE POLES

(71) Applicant: International Business Machines Corporation, Armonk, NY (US)

(72) Inventors: Robert G. Biskeborn, Hollister, CA (US); Jason Liang, Campbell, CA (US); Calvin S. Lo, Saratoga, CA (US); Andrew C. Ting, El Prado, NM (US)

(73) Assignee: International Business Machines Corporation, Armonk, NY (US)

(*) Notice: Subject to any disclaimer, the term of this patent is extended or adjusted under 35 U.S.C. 154(b) by 0 days.

This patent is subject to a terminal disclaimer.

(21) Appl. No.: 15/808,796

(22) Filed: Nov. 9, 2017

(65) Prior Publication Data

US 2018/0068678 A1 Mar. 8, 2018

Related U.S. Application Data

(63) Continuation of application No. 15/260,115, filed on Sep. 8, 2016, now Pat. No. 9,886,972, which is a
(Continued)

(51) Int. Cl.
*G11B 5/187* (2006.01)
*G11B 5/265* (2006.01)
(Continued)

(52) U.S. Cl.
CPC .......... *G11B 5/3967* (2013.01); *G11B 5/0083* (2013.01); *G11B 5/11* (2013.01);
(Continued)

(58) Field of Classification Search
None
See application file for complete search history.

(56) References Cited

U.S. PATENT DOCUMENTS 3,994,793 A 11/1976 Harvilchuck et al.
4,082,637 A 4/1978 Misiano et al.
(Continued)

FOREIGN PATENT DOCUMENTS

CN 1675749 A 9/2005
EP 001653450 A2 5/2006
(Continued)

OTHER PUBLICATIONS

Supplemental Notice of Allowance from U.S. Appl. No. 15/140,362, dated Jan. 22, 2018.
(Continued)

*Primary Examiner* — Craig A. Renner
(74) *Attorney, Agent, or Firm* — Zilka-Kotab, P.C.

(57) ABSTRACT

An apparatus according to one embodiment includes a module having a substrate, read and write transducers positioned towards a media facing side of the module, and a closure. The write transducers include write poles having media facing sides with zero or near-zero recession from a plane extending along the media facing side of a substrate of the module. The read transducers each have two shields. Media facing sides of the two shields are recessed a same amount from the plane, and are more recessed from the plane than the write poles.

14 Claims, 11 Drawing Sheets

Related U.S. Application Data continuation of application No. 14/668,860, filed on Mar. 25, 2015, now Pat. No. 9,472,213, which is a continuation of application No. 13/601,117, filed on Aug. 31, 2012, now Pat. No. 9,001,463.

(51) Int. Cl.

| | | |
|---|---|---|
| *G11B 5/29* | (2006.01) | |
| *G11B 5/11* | (2006.01) | |
| *G11B 5/31* | (2006.01) | |
| *G11B 5/39* | (2006.01) | |
| *G11B 5/008* | (2006.01) | |
| *G11B 5/48* | (2006.01) | |
| *G11B 5/60* | (2006.01) | |
| *G11B 5/255* | (2006.01) | |

(52) U.S. Cl.
CPC ............ *G11B 5/1871* (2013.01); *G11B 5/265* (2013.01); *G11B 5/29* (2013.01); *G11B 5/3109* (2013.01); *G11B 5/3912* (2013.01); *G11B 5/4893* (2013.01); *G11B 5/60* (2013.01); *G11B 5/255* (2013.01)

(56) References Cited

U.S. PATENT DOCUMENTS

| | | | |
|---|---|---|---|
| 4,229,247 | A | 10/1980 | Chiu et al. |
| 4,620,898 | A | 11/1986 | Banks et al. |
| 4,918,554 | A | 4/1990 | Bajorek et al. |
| 5,188,705 | A | 2/1993 | Swanson et al. |
| 5,403,436 | A | 4/1995 | Fujimura et al. |
| 5,606,478 | A | 2/1997 | Chen et al. |
| 5,822,153 | A | 10/1998 | Lairson et al. |
| 5,991,119 | A | 11/1999 | Boutaghou et al. |
| 6,140,655 | A | 10/2000 | Russell et al. |
| 6,579,465 | B1 | 6/2003 | Takamatsu et al. |
| 6,580,586 | B1 | 6/2003 | Biskeborn |
| 6,667,244 | B1 | 12/2003 | Cox et al. |
| 6,687,089 | B2 | 2/2004 | Chiba et al. |
| 6,858,537 | B2 | 2/2005 | Brewer |
| 7,023,658 | B1 | 4/2006 | Knapp et al. |
| 7,508,624 | B1 | 3/2009 | Lauer |
| 7,532,434 | B1 | 5/2009 | Schreck et al. |
| 7,807,579 | B2 | 10/2010 | Yang et al. |
| 9,001,463 | B2 | 4/2015 | Biskeborn et al. |
| 9,349,395 | B2 | 5/2016 | Biskeborn et al. |
| 9,472,213 | B2 | 10/2016 | Biskeborn et al. |
| 9,886,972 | B2 | 2/2018 | Biskeborn et al. |
| 9,966,237 | B2 | 5/2018 | Biskeborn et al. |
| 2002/0024755 | A1 | 2/2002 | Kim et al. |
| 2003/0180495 | A1 | 9/2003 | Ito et al. |
| 2003/0227716 | A1 | 12/2003 | Yamakura et al. |
| 2005/0264930 | A1 | 12/2005 | Gider et al. |
| 2007/0081278 | A1 | 4/2007 | Feldbaum et al. |
| 2008/0088979 | A1* | 4/2008 | Nakata ..................... G11B 5/40 360/313 |
| 2008/0112076 | A1 | 5/2008 | Biskeborn |
| 2008/0261405 | A1 | 10/2008 | Yang et al. |
| 2008/0266711 | A1 | 10/2008 | Nibarger et al. |
| 2008/0278854 | A1 | 11/2008 | Biskeborn |
| 2008/0314736 | A1 | 12/2008 | Biskeborn et al. |
| 2009/0015970 | A1 | 1/2009 | Biskeborn et al. |
| 2009/0052093 | A1 | 2/2009 | Kawakita et al. |
| 2009/0251828 | A1 | 10/2009 | Schreck et al. |
| 2010/0007976 | A1 | 1/2010 | Baumgart et al. |
| 2010/0062608 | A1 | 3/2010 | Hopfe et al. |
| 2012/0189946 | A1 | 7/2012 | Hashimoto et al. |
| 2014/0061033 | A1 | 3/2014 | Biskeborn et al. |
| 2014/0063646 | A1 | 3/2014 | Biskeborn et al. |
| 2015/0199984 | A1 | 7/2015 | Biskeborn et al. |
| 2016/0240355 | A1 | 8/2016 | Biskeborn et al. |
| 2017/0004849 | A1 | 1/2017 | Biskeborn et al. |

FOREIGN PATENT DOCUMENTS

| | | |
|---|---|---|
| EP | 1850334 A1 | 10/2007 |
| JP | 09055169 | 2/1997 |
| JP | 2008277812 A | 11/2008 |

OTHER PUBLICATIONS

Biskeborn et al., U.S. Appl. No. 13/601,117, filed Aug. 31, 2012.
Biskeborn et al., U.S. Appl. No. 13/601,739, filed Aug. 31, 2012.
Nikitin et al., "Spatial and temporal profiling of protrusion in magnetic recording heads," IEEE Transactions on Magnetics, vol. 40, No. 1, Jan. 2004, pp. 326-331.
Non-Final Office Action from U.S. Appl. No. 13/601,117, dated Mar. 13, 2014.
Final Office Action from U.S. Appl. No. 13/601,117, dated Sep. 17, 2014.
Notice of Allowance from U.S. Appl. No. 13/601,117, dated Nov. 28, 2014.
Non-Final Office Action from U.S. Appl. No. 13/601,739, dated Mar. 24, 2015.
Election/Restriction Requirement from U.S. Appl. No. 13/601,117, dated Jan. 21, 2014.
Biskeborn et al., U.S. Appl. No. 14/668,860, filed Mar. 25, 2015.
Election/Restriction Requirement from U.S. Appl. No. 14/668,860, dated Jul. 6, 2015.
Konuma et al., "Water vapor controlling selective reactive ion etching of SiO2/Si in NF3 plasma", Journal of Applied Physics, vol. 74 Issue 3, Aug. 1993, pp. 1575-1578.
Non-Final Office Action from U.S. Appl. No. 13/601,739, dated Oct. 15, 2015.
Sandmeyer Steel Company, "Specification Sheet: Alloy 310/310S/310H: A Multi-Purpose Austenitic Heat Resistant Stainless Steel with Oxidation Resistance Under Mildly Cyclic Conditions to 2010° F," retrieved from www.sandmeyersteel.com/images/310-Spec-Sheet.pdf, Jun. 2014, 2 pages.
Non-Final Office Action from U.S. Appl. No. 14/668,860, dated Sep. 29, 2015.
Final Office Action from U.S. Appl. No. 13/601,739, dated Dec. 23, 2015.
Advisory Action from U.S. Appl. No. 13/601,739, dated Jan. 25, 2016.
Notice of Allowance from U.S. Appl. No. 13/601,739, dated Mar. 2, 2016.
Final Office Action from U.S. Appl. No. 14/668,860, dated Apr. 15, 2016.
Biskeborn et al., U.S. Appl. No. 15/140,362, filed Apr. 27, 2016.
Notice of Allowance from U.S. Appl. No. 14/668,860, dated Jul. 6, 2016.
Biskeborn et al., U.S. Appl. No. 15/260,115, filed Sep. 8, 2016.
Non-Final Office Action from U.S. Appl. No. 15/140,362, dated Dec. 15, 2016.
Nguyen et al., "Operating a radio-frequency plasma source on water vapor," Review of Scientific Instruments, vol. 80, Aug. 24, 2009, pp. 083503-1-083503-8.
Non-Final Office Action from U.S. Appl. No. 15/260,115, dated Jan. 26, 2017.
Final Office Action from U.S. Appl. No. 15/140,362, dated May 17, 2017.
Advisory Action from U.S. Appl. No. 15/140,362, dated Jul. 24, 2017.
Final Office Action from U.S. Appl. No. 15/260,115, dated Jul. 24, 2017.
Non-Final Office Action from U.S. Appl. No. 15/140,362, dated Sep. 11, 2017.
Notice of Allowance from U.S. Appl. No. 15/260,115, dated Sep. 27, 2017.
Supplemental Notice of Allowance from U.S. Appl. No. 15/260,115, dated Dec. 19, 2017.
Notice of Allowance from U.S. Appl. No. 15/140,362, dated Jan. 4, 2018.

(56) References Cited

OTHER PUBLICATIONS

Supplemental Notice of Allowance from U.S. Appl. No. 15/140,362, dated Feb. 20, 2018.
Supplemental Notice of Allowance from U.S. Appl. No. 15/140,362, dated Apr. 10, 2018.

* cited by examiner

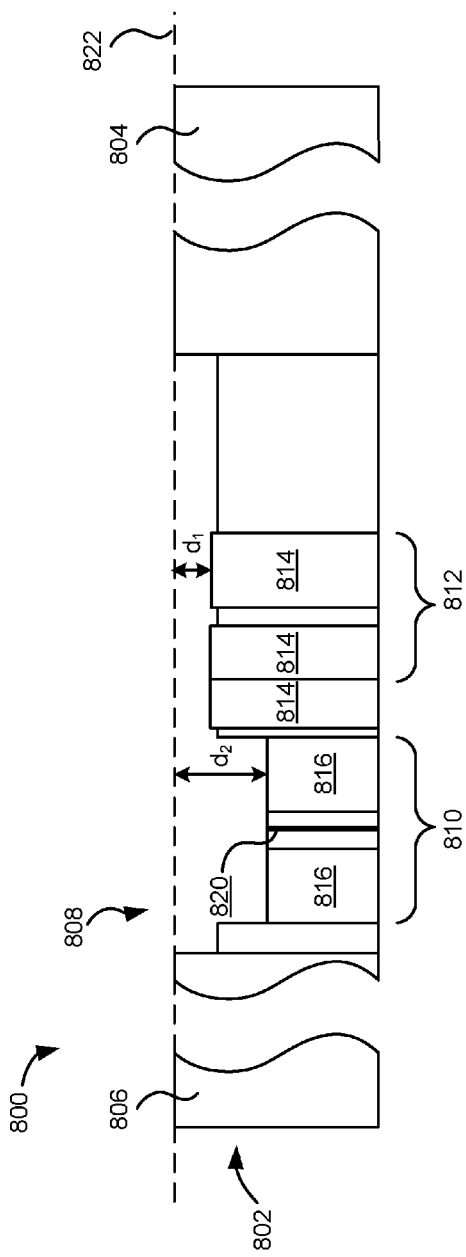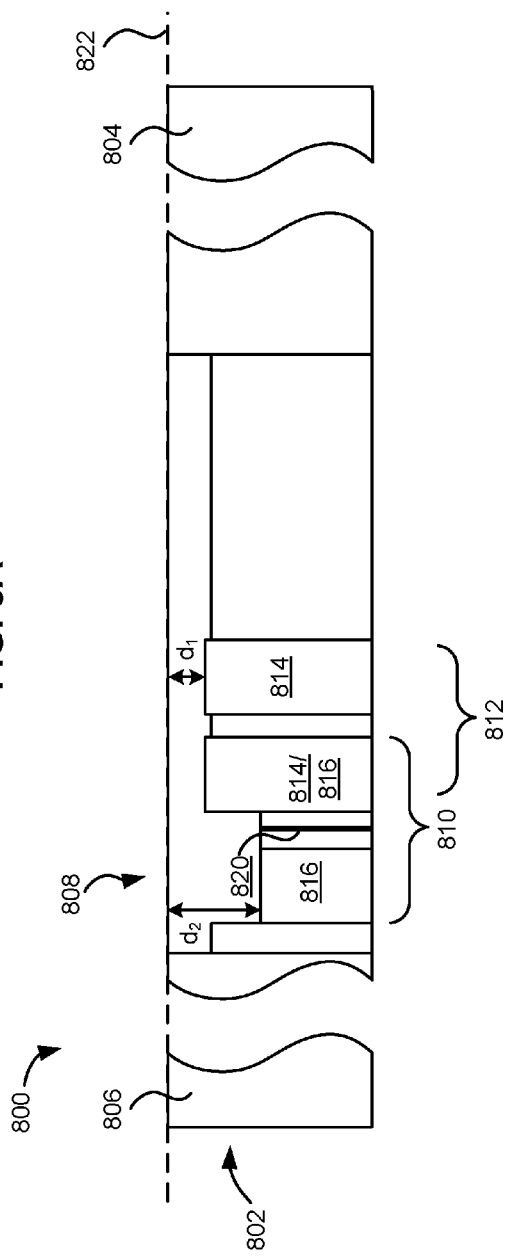

MAGNETIC RECORDING HEAD HAVING PROTECTED READER SENSORS AND NEAR ZERO RECESSED WRITE POLES

BACKGROUND

The present invention relates to data storage systems, and more particularly, this invention relates to magnetic recording heads having protected reader sensors and near zero recessed write poles.

In magnetic storage systems, data is read from and written onto magnetic recording media utilizing magnetic transducers. Data is written on the magnetic recording media by moving a magnetic recording transducer to a position over the media where the data is to be stored. The magnetic recording transducer then generates a magnetic field, which encodes the data into the magnetic media. Data is read from the media by similarly positioning the magnetic read transducer and then sensing the magnetic field of the magnetic media. Read and write operations may be independently synchronized with the movement of the media to ensure that the data can be read from and written to the desired location on the media.

An important and continuing goal in the data storage industry is that of increasing the density of data stored on a medium. For tape storage systems, that goal has led to increasing the track and linear bit density on recording tape, and decreasing the thickness of the magnetic tape medium. However, the development of small footprint, higher performance tape drive systems has created various problems in the design of a tape head assembly for use in such systems.

In a tape drive system, magnetic tape is moved over the surface of the tape head at high speed. Usually the tape head is designed to minimize the spacing between the head and the tape. The spacing between the magnetic head and the magnetic tape is crucial so that the recording gaps of the transducers, which are the source of the magnetic recording flux, are in near contact with the tape to effect writing sharp transitions, and so that the read element is in near contact with the tape to provide effective coupling of the magnetic field from the tape to the read element.

BRIEF SUMMARY

An apparatus according to one embodiment includes a module having a substrate, read and write transducers positioned towards a media facing side of the module, and a closure. The write transducers include write poles having media facing sides with zero or near-zero recession from a plane extending along the media facing side of a substrate of the module. The read transducers each have two shields. Media facing sides of the two shields are recessed a same amount from the plane, and are more recessed from the plane than the write poles.

An apparatus according to another embodiment includes a substrate having a media facing side, and an array of read and write transducers. The write transducers include write poles having media facing sides, and the read transducers each have two shields. The media facing sides of the shields are recessed a same amount from a plane extending along the media facing side of the substrate.

An apparatus according to yet another embodiment includes a pair of read and write transducers above a substrate. The read transducer has two shields. Media facing sides of the shields are more recessed from a plane extending along the media facing side of the substrate than media facing sides of write poles of the write transducer. The media facing sides of the shields are recessed a same amount from the plane.

Any of these embodiments may be implemented in a magnetic data storage system such as a tape drive system, which may include a magnetic head, a drive mechanism for passing a magnetic medium (e.g., recording tape) over the magnetic head, and a controller electrically coupled to the magnetic head.

Other aspects and embodiments of the present invention will become apparent from the following detailed description, which, when taken in conjunction with the drawings, illustrate by way of example the principles of the invention.

BRIEF DESCRIPTION OF THE SEVERAL VIEWS OF THE DRAWINGS

FIG. 8A is a partial cross-sectional view of a magnetic head according to one embodiment.

FIG. 8B is a partial cross-sectional view of a magnetic head according to one embodiment.

DETAILED DESCRIPTION

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified.

The following description discloses several preferred embodiments of magnetic storage systems, as well as operation and/or component parts thereof.

In one general embodiment, a magnetic head includes a module, the module having both read and write transducers positioned towards a media facing side of the module, wherein the read and write transducers are selected from a group consisting of piggyback read-write transducers, merged read-write transducers, interleaved read and write transducers, and an array of write transducers flanked by servo read transducers; wherein the write transducers include write poles having media facing sides with negative, zero or near-zero recession from a plane extending along the media facing side of a substrate of the module; wherein the read transducers each have at least one shield, wherein a media facing side of the at least one shield is more recessed from the plane than the write poles.

In another general embodiment, a module includes an array of read and write transducers extending along a media facing side, wherein the read and write transducers are selected from a group consisting of piggyback read-write transducers, merged read-write transducers, interleaved read and write transducers, and an array of write transducers flanked by servo read transducers; wherein the write transducers include write poles having media facing sides; wherein the read transducers each have at least one shield, wherein a media facing side of the at least one shield is recessed from a plane extending across the media facing side of the write poles by at least 5 nm.

In yet another general embodiment, a magnetic head includes a pair of read and write transducers selected from a group consisting of piggyback read-write transducers, and merged read-write transducers; wherein the write transducers include write poles having media facing sides with negative, zero or near-zero recession from a plane extending along the media facing side of the substrate; wherein the read transducers each have at least one shield, wherein a media facing side of the at least one shield is more recessed from the plane than the write poles.

Figure 1A:
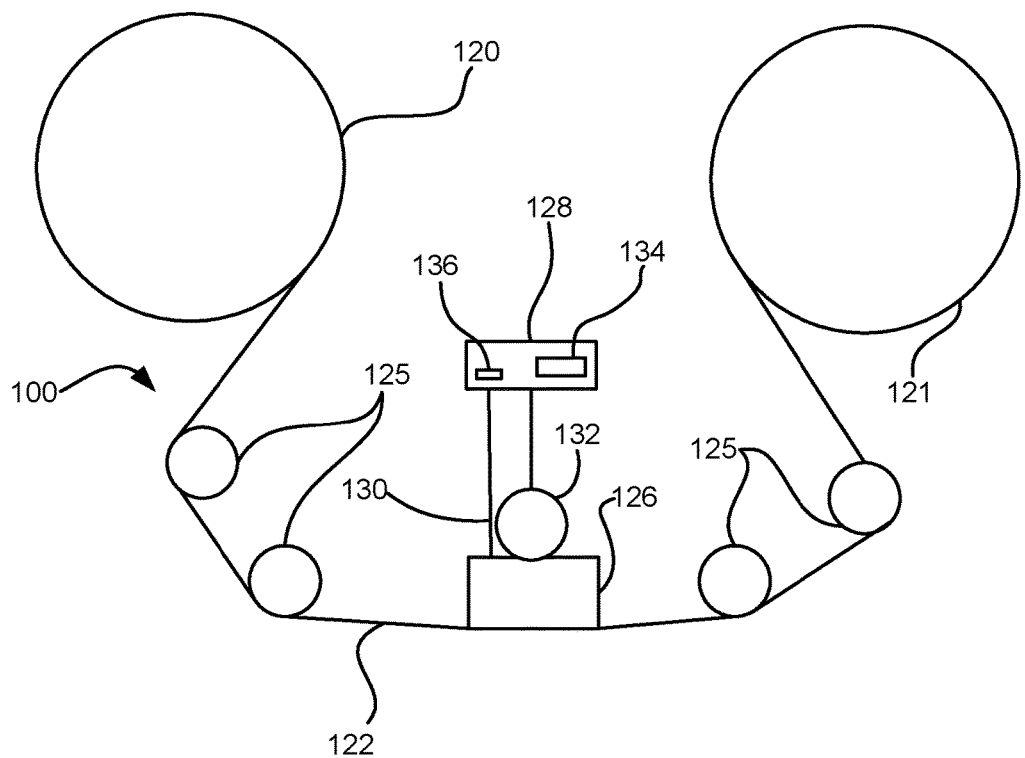
FIG. 1A is a schematic diagram of a simplified tape drive system according to one embodiment.

FIG. 1A illustrates a simplified tape drive 100 of a tape-based data storage system, which may be employed in the context of the present invention. While one specific implementation of a tape drive is shown in FIG. 1A, it should be noted that the embodiments described herein may be implemented in the context of any type of tape drive system.

As shown, a tape supply cartridge 120 and a take-up reel 121 are provided to support a tape 122. One or more of the reels may form part of a removable cartridge and are not necessarily part of the system 100. The tape drive, such as that illustrated in FIG. 1A, may further include drive motor(s) to drive the tape supply cartridge 120 and the take-up reel 121 to move the tape 122 over a tape head 126 of any type. Such head may include an array of readers, writers, or both.

Guides 125 guide the tape 122 across the tape head 126. Such tape head 126 is in turn coupled to a controller 128 via a cable 130. The controller 128, may be or include a processor and/or any logic for controlling any subsystem of the drive 100. For example, the controller 128 typically controls head functions such as servo following, data writing, data reading, etc. The controller 128 may operate under logic known in the art, as well as any logic disclosed herein. The controller 128 may be coupled to a memory 136 of any known type, which may store instructions executable by the controller 128. Moreover, the controller 128 may be configured and/or programmable to perform or control some or all of the methodology presented herein. Thus, the controller may be considered configured to perform various operations by way of logic programmed into a chip; software, firmware, or other instructions being available to a processor; etc. and combinations thereof.

The cable 130 may include read/write circuits to transmit data to the head 126 to be recorded on the tape 122 and to receive data read by the head 126 from the tape 122. An actuator 132 controls position of the head 126 relative to the tape 122.

An interface 134 may also be provided for communication between the tape drive 100 and a host (integral or external) to send and receive the data and for controlling the operation of the tape drive 100 and communicating the status of the tape drive 100 to the host, all as will be understood by those of skill in the art.

Figure 1B:
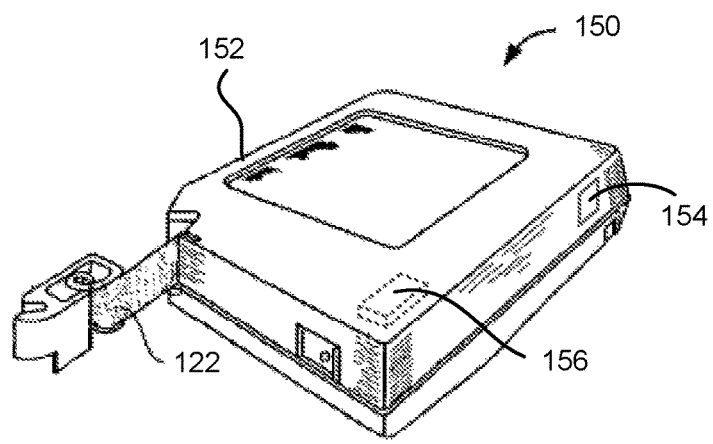
FIG. 1B is a schematic diagram of a tape cartridge according to one embodiment.

FIG. 1B illustrates an exemplary tape cartridge 150 according to one embodiment. Such tape cartridge 150 may be used with a system such as that shown in FIG. 1A. As shown, the tape cartridge 150 includes a housing 152, a tape 122 in the housing 152, and a nonvolatile memory 156 coupled to the housing 152. In some approaches, the nonvolatile memory 156 may be embedded inside the housing 152, as shown in FIG. 1B. In more approaches, the nonvolatile memory 156 may be attached to the inside or outside of the housing 152 without modification of the housing 152. For example, the nonvolatile memory may be embedded in a self-adhesive label 154. In one preferred embodiment, the nonvolatile memory 156 may be a Flash memory device, ROM device, etc., embedded into or coupled to the inside or outside of the tape cartridge 150. The nonvolatile memory is accessible by the tape drive and the tape operating software (the driver software), and/or other device.

Figure 2:
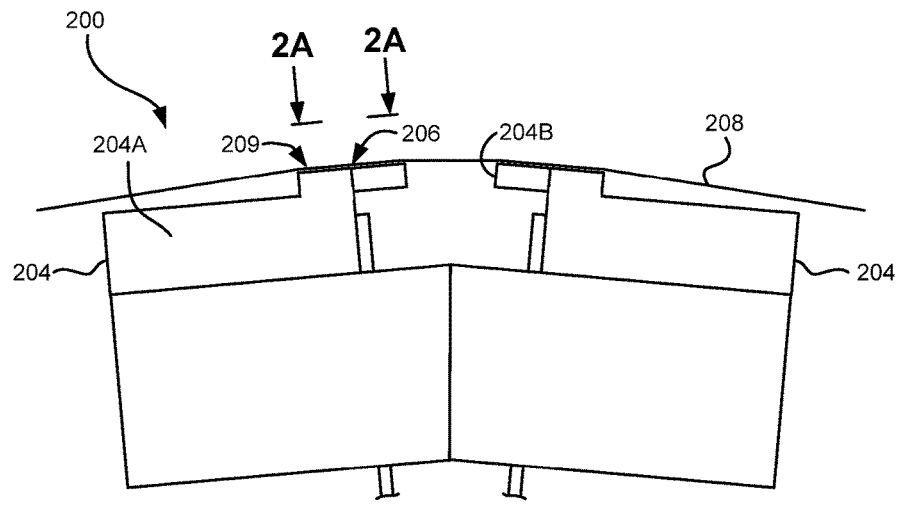
FIG. 2 illustrates a side view of a flat-lapped, bi-directional, two-module magnetic tape head according to one embodiment.
Figure 2A:
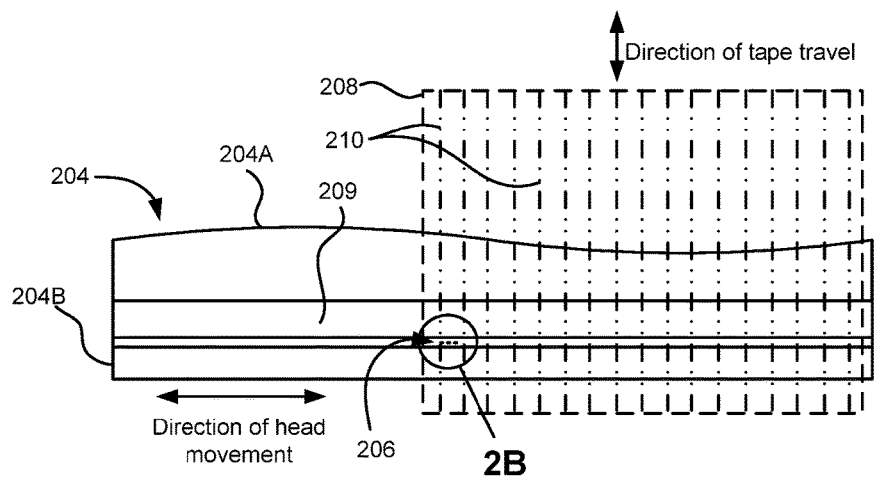
FIG. 2A is a tape bearing surface view taken from Line 2A of FIG. 2.

FIG. 2A illustrates the tape bearing surface 209 of one of the modules 204 taken from Line 2A of FIG. 2. A representative tape 208 is shown in dashed lines. The module 204 is preferably long enough to be able to support the tape as the head steps between data bands.

In this example, the tape 208 includes 4 to 22 data bands, e.g., with 8 data bands and 9 servo tracks 210, as shown in FIG. 2A on a one-half inch wide tape 208. The data bands are defined between servo tracks 210. Each data band may include a number of data tracks, for example 512 data tracks (not shown). During read/write operations, the readers and/or writers 206 are positioned to specific track positions within one of the data bands. Outer readers, sometimes called servo readers, read the servo tracks 210. The servo signals are in turn used to keep the readers and/or writers 206 aligned with a particular set of tracks during the read/write operations.

Figure 2B:
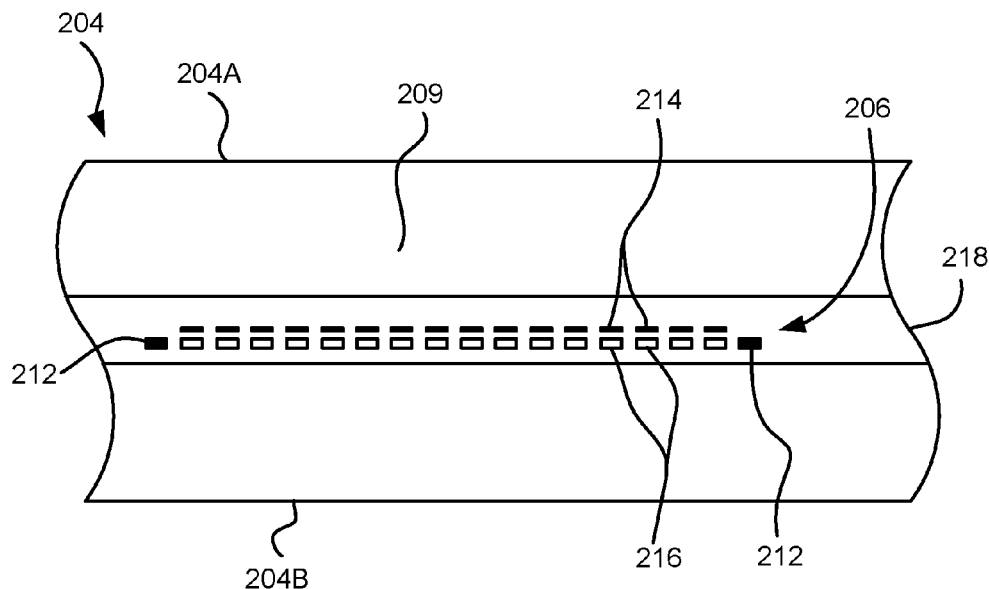
FIG. 2B is a detailed view taken from Circle 2B of FIG. 2A.

FIG. 2B depicts a plurality of readers and/or writers 206 formed in a gap 218 on the module 204 in Circle 2B of FIG. 2A. As shown, the array of readers and writers 206 includes, for example, 16 writers 214, 16 readers 216 and two servo readers 212, though the number of elements may vary. Illustrative embodiments include 8, 16, 32, 40, and 64 active readers and/or writers 206 per array, and alternatively interleaved designs having odd numbers of reader or writers such as 17, 25, 33, etc. A preferred embodiment includes 32 readers per array and/or 32 writers per array, where the actual number of transducing elements could be greater, e.g., 33, 34, etc. This allows the tape to travel more slowly, thereby reducing speed-induced tracking and mechanical difficulties, and/or execute fewer "wraps" to fill or read the tape. While the readers and writers may be arranged in a piggyback configuration as shown in FIG. 2B, the readers 216 and writers 214 may also be arranged in an interleaved configuration. Alternatively, each array of readers and/or writers 206 may be readers or writers only, and the arrays may contain one or more servo readers 212. As noted by considering FIGS. 2 and 2A-B together, each module 204 may include a complementary set of readers and/or writers 206 for such things as bi-directional reading and writing, read-while-write capability, backward compatibility, etc.

Figure 2C:
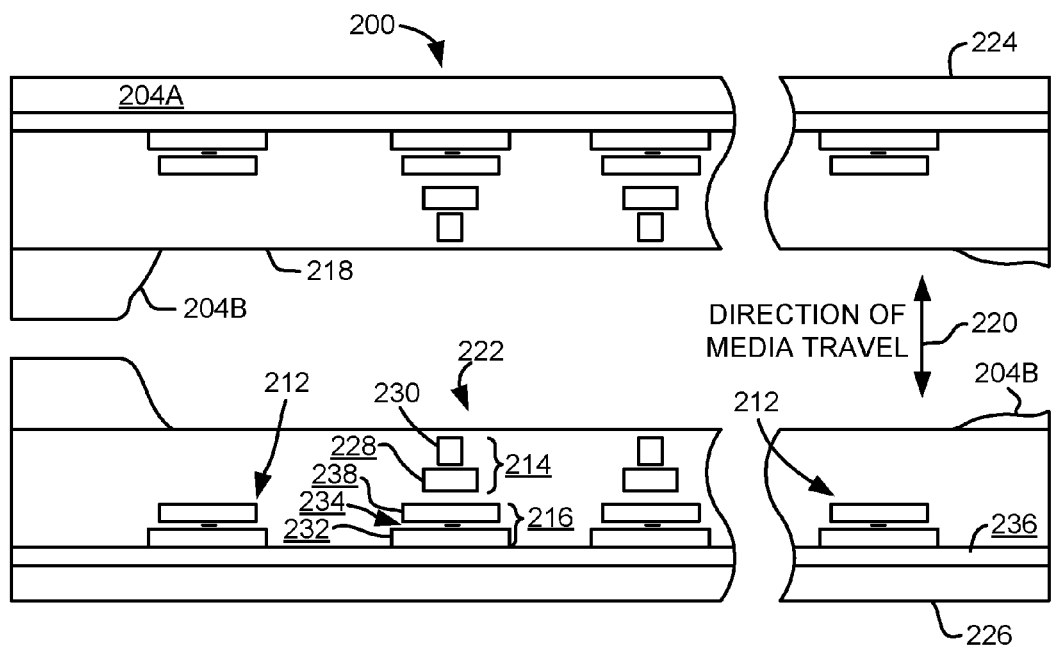
FIG. 2C is a detailed view of a partial tape bearing surface of a pair of modules.

FIG. 2C shows a partial tape bearing surface view of complimentary modules of a magnetic tape head 200 according to one embodiment. In this embodiment, each module has a plurality of read/write (R/W) pairs in a piggyback configuration formed on a common substrate 204A and an optional electrically insulative layer 236. The writers, exemplified by the write head 214 and the readers, exemplified by the read head 216, are aligned parallel to a direction of travel of a tape medium thereacross to form an R/W pair, exemplified by the R/W pair 222.

Several R/W pairs 222 may be present, such as 8, 16, 32 pairs, etc. The R/W pairs 222 as shown are linearly aligned in a direction generally perpendicular to a direction of tape travel thereacross. However, the pairs may also be aligned diagonally, etc. Servo readers 212 are positioned on the outside of the array of R/W pairs, the function of which is well known.

Generally, the magnetic tape medium moves in either a forward or reverse direction as indicated by arrow 220. The magnetic tape medium and head assembly 200 operate in a transducing relationship in the manner well-known in the art. The piggybacked MR head assembly 200 includes two thin-film modules 224 and 226 of generally identical construction.

Modules 224 and 226 are joined together with a space present between closures 204B thereof (partially shown) to form a single physical unit to provide read-while-write capability by activating the writer of the leading module and reader of the trailing module aligned with the writer of the leading module parallel to the direction of tape travel relative thereto. When a module 224, 226 of a piggyback head 200 is constructed, layers are formed in the gap 218 created above an electrically conductive substrate 204A (partially shown), e.g., of AlTiC, in generally the following order for the R/W pairs 222: an insulating layer 236, a first shield 232 typically of an iron alloy such as NiFe (permalloy), CZT or Al—Fe—Si (Sendust), a sensor 234 for sensing a data track on a magnetic medium, a second shield 238 typically of a nickel-iron alloy (e.g., 80/20 NiFe, also known as Permalloy, in atomic percent (at %)), first and second writer pole tips 228, 230, and a coil (not shown). The sensor may be of any known type, including those based on MR, GMR, AMR, tunnelling magnetoresistance (TMR), etc.

The first and second writer poles 228, 230 may be fabricated from high magnetic moment materials such as 45/55 NiFe. Note that these materials are provided by way of example only, and other materials may be used. Additional layers such as insulation between the shields and/or pole tips and an insulation layer surrounding the sensor may be present. Illustrative materials for the insulation include alumina and other oxides, insulative polymers, etc.

Figure 4:
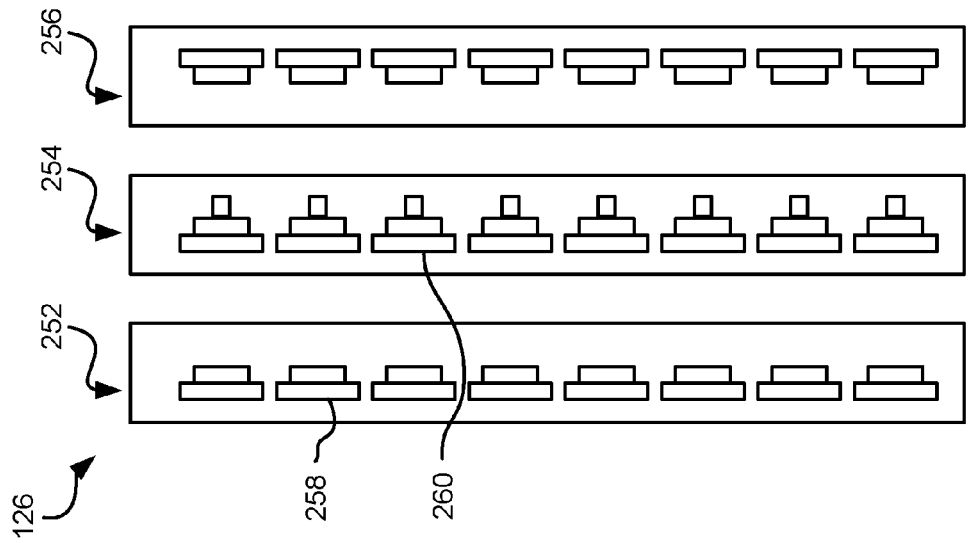
FIG. 4 is a partial tape bearing surface view of a magnetic head having a read-write-read configuration.
Figure 3:
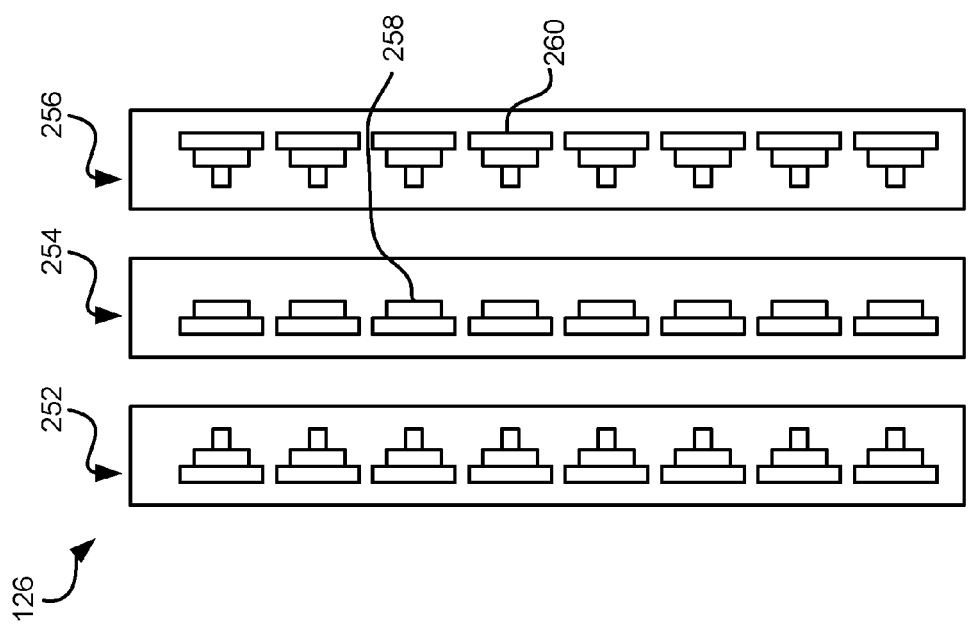
FIG. 3 is a partial tape bearing surface view of a magnetic head having a write-read-write configuration.

The configuration of the tape head 126 according to one embodiment includes multiple modules, preferably three or more. In a write-read-write (W-R-W) head, outer modules for writing flank one or more inner modules for reading. Referring to FIG. 3, depicting a W-R-W configuration, the outer modules 252, 256 each include one or more arrays of writers 260. The inner module 254 of FIG. 3 includes one or more arrays of readers 258 in a similar configuration. Variations of a multi-module head include a R-W-R head (FIG. 4), a R-R-W head, a W-W-R head, etc. In yet other variations, one or more of the modules may have read/write pairs of transducers. Moreover, more than three modules may be present. In further approaches, two outer modules may flank two or more inner modules, e.g., in a W-R-R-W, a R-W-W-R arrangement, etc. For simplicity, a W-R-W head is used primarily herein to exemplify embodiments of the present invention. One skilled in the art apprised with the teachings herein will appreciate how permutations of the present invention would apply to configurations other than a W-R-W configuration.

Figure 5:
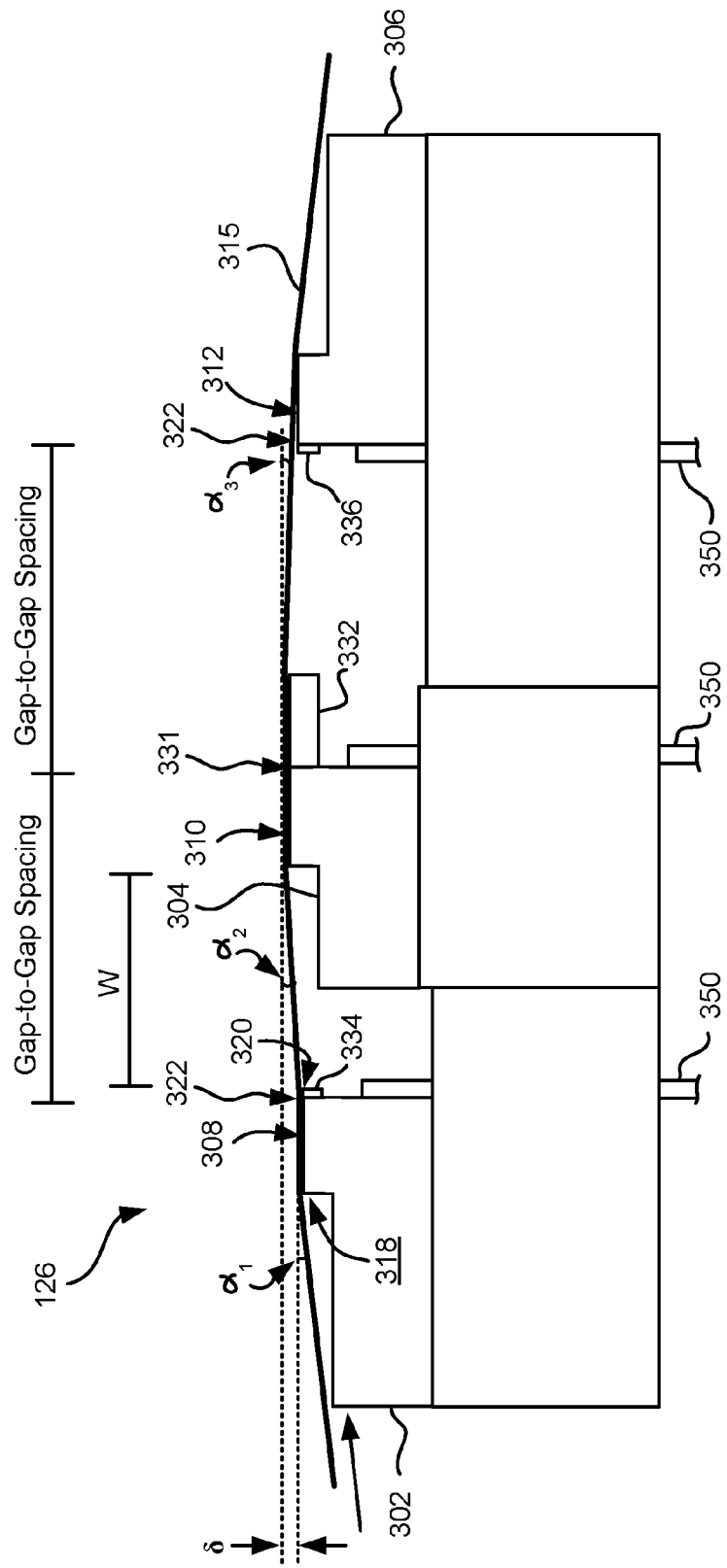
FIG. 5 is a side view of a magnetic tape head with three modules according to one embodiment where the modules all generally lie along about parallel planes.

FIG. 5 illustrates a magnetic head 126 according to one embodiment of the present invention that includes first, second and third modules 302, 304, 306 each having a tape bearing surface 308, 310, 312 respectively, which may be flat, contoured, etc. Note that while the term "tape bearing surface" appears to imply that the surface facing the tape 315 is in physical contact with the tape bearing surface, this is not necessarily the case. Rather, only a portion of the tape may be in contact with the tape bearing surface, constantly or intermittently, with other portions of the tape riding (or "flying") above the tape bearing surface on a layer of air, sometimes referred to as an "air bearing". The first module 302 will be referred to as the "leading" module as it is the first module encountered by the tape in a three module design for tape moving in the indicated direction. The third module 306 will be referred to as the "trailing" module. The trailing module follows the middle module and is the last module seen by the tape in a three module design. The leading and trailing modules 302, 306 are referred to collectively as outer modules. Also note that the outer modules 302, 306 will alternate as leading modules, depending on the direction of travel of the tape 315.

Figure 6:
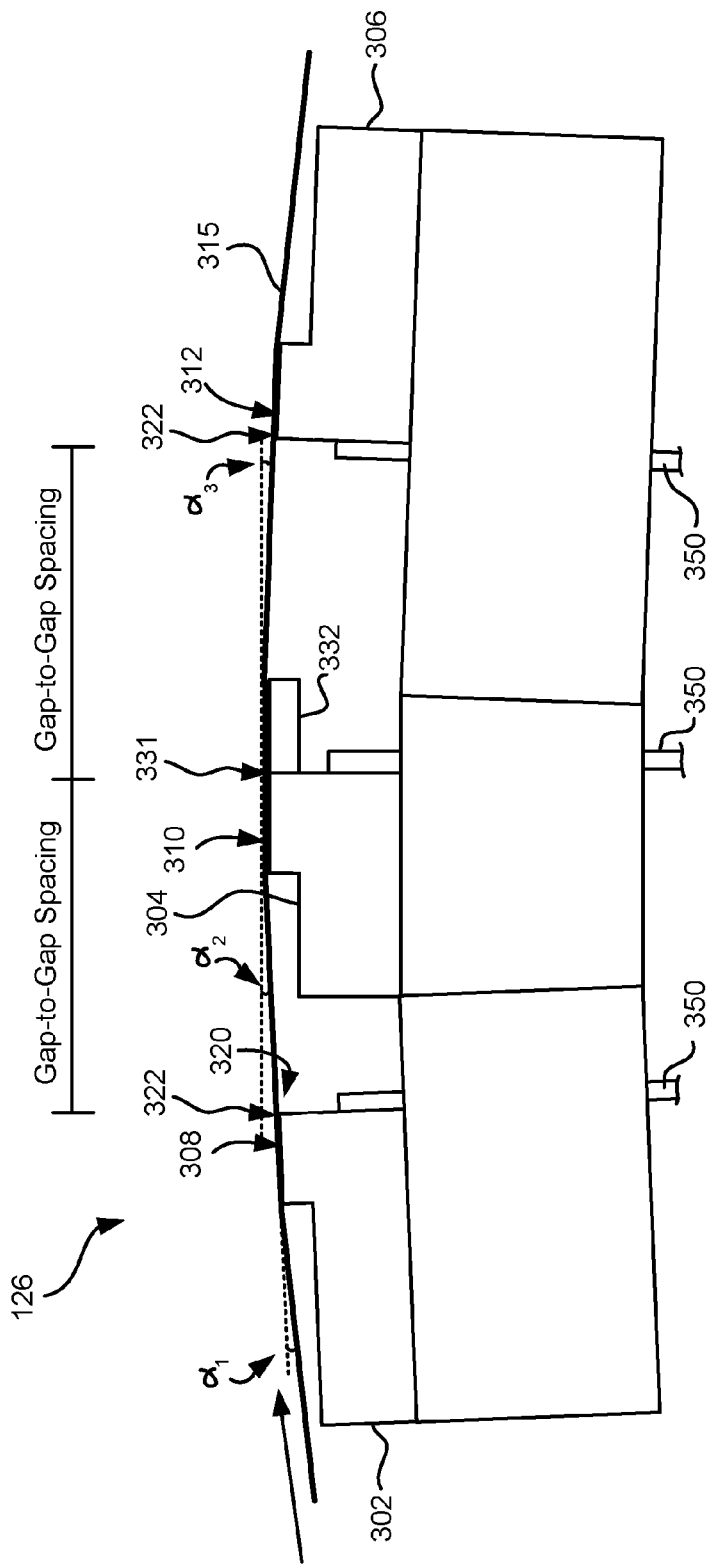
FIG. 6 is a side view of a magnetic tape head with three modules in a tangent (angled) configuration.

In one embodiment, the tape bearing surfaces 308, 310, 312 of the first, second and third modules 302, 304, 306 lie on about parallel planes (which is meant to include parallel and nearly parallel planes, e.g., between parallel and tangential as in FIG. 6), and the tape bearing surface 310 of the second module 304 is above the tape bearing surfaces 308, 312 of the first and third modules 302, 306. As described below, this has the effect of creating the desired wrap angle $\alpha_2$ of the tape relative to the tape bearing surface 310 of the second module 304.

Where the tape bearing surfaces 308, 310, 312 lie along parallel or nearly parallel yet offset planes, intuitively, the tape should peel off of the tape bearing surface 308 of the leading module 302. However, the vacuum created by the skiving edge 318 of the leading module 302 has been found by experimentation to be sufficient to keep the tape adhered to the tape bearing surface 308 of the leading module 302. The trailing edge 320 of the leading module 302 (the end from which the tape leaves the leading module 302) is the approximate reference point which defines the wrap angle $\alpha_2$ over the tape bearing surface 310 of the second module 304. The tape stays in close proximity to the tape bearing surface until close to the trailing edge 320 of the leading module 302. Accordingly, read and/or write elements 322 may be located near the trailing edges of the outer modules 302, 306. These embodiments are particularly adapted for write-read-write applications.

A benefit of this and other embodiments described herein is that, because the outer modules 302, 306 are fixed at a determined offset from the second module 304, the inner wrap angle $\alpha_2$ is fixed when the modules 302, 304, 306 are coupled together or are otherwise fixed into a head. The inner wrap angle $\alpha_2$ is approximately $\tan^{-1}(\delta/W)$ where $\delta$ is the height difference between the planes of the tape bearing surfaces 308, 310 and W is the width between the opposing ends of the tape bearing surfaces 308, 310. An illustrative inner wrap angle $\alpha_2$ is in a range of about 0.5° to about 1.1°, though can be any angle required by the design.

Beneficially, the inner wrap angle $\alpha_2$ may be set slightly less on the side of the module 304 receiving the tape (leading edge) than the inner wrap angle $\alpha_3$ on the trailing edge, as the tape 315 rides above the trailing module 306. This difference is generally beneficial as a smaller $\alpha_3$ tends to oppose what has heretofore been a steeper exiting effective wrap angle.

Note that the tape bearing surfaces 308, 312 of the outer modules 302, 306 are positioned to achieve a negative wrap angle at the trailing edge 320 of the leading module 302. This is generally beneficial in helping to reduce friction due to contact with the trailing edge 320, provided that proper consideration is given to the location of the crowbar region that forms in the tape where it peels off the head. This negative wrap angle also reduces flutter and scrubbing damage to the elements on the leading module 302. Further, at the trailing module 306, the tape 315 flies over the tape bearing surface 312 so there is virtually no wear on the elements when tape is moving in this direction. Particularly, the tape 315 entrains air and so will not significantly ride on the tape bearing surface 312 of the third module 306 (some contact may occur). This is permissible, because the leading module 302 is writing while the trailing module 306 is idle.

Writing and reading functions are performed by different modules at any given time. In one embodiment, the second module 304 includes a plurality of data and optional servo readers 331 and no writers. The first and third modules 302, 306 include a plurality of writers 322 and no readers, with the exception that the outer modules 302, 306 may include optional servo readers. The servo readers may be used to position the head during reading and/or writing operations. The servo reader(s) on each module are typically located towards the end of the array of readers or writers.

By having only readers or side by side writers and servo readers in the gap between the substrate and closure, the gap length can be substantially reduced. Typical heads have piggybacked readers and writers, where the writer is formed above each reader. A typical gap is 25-35 microns. However, irregularities on the tape may tend to droop into the gap and create gap erosion. Thus, the smaller the gap is the better. The smaller gap enabled herein exhibits fewer wear related problems.

In some embodiments, the second module 304 has a closure, while the first and third modules 302, 306 do not have a closure. Where there is no closure, preferably a hard coating is added to the module. One preferred coating is diamond-like carbon (DLC).

In the embodiment shown in FIG. 5, the first, second, and third modules 302, 304, 306 each have a closure 332, 334, 336, which extends the tape bearing surface of the associated module, thereby effectively positioning the read/write elements away from the edge of the tape bearing surface. The closure 332 on the second module 304 can be a ceramic closure of a type typically found on tape heads. The closures 334, 336 of the first and third modules 302, 306, however, may be shorter than the closure 332 of the second module 304 as measured parallel to a direction of tape travel over the respective module. This enables positioning the modules closer together. One way to produce shorter closures 334, 336 is to lap the standard ceramic closures of the second module 304 an additional amount. Another way is to plate or deposit thin film closures above the elements during thin film processing. For example, a thin film closure of a hard material such as Sendust or nickel-iron alloy (e.g., 45/55) can be formed on the module.

With reduced-thickness ceramic or thin film closures 334, 336 or no closures on the outer modules 302, 306, the write-to-read gap spacing can be reduced to less than about 1 mm, e.g., about 0.75 mm, or 50% less than standard LTO tape head spacing. The open space between the modules 302, 304, 306 can still be set to approximately 0.5 to 0.6 mm, which in some embodiments is ideal for stabilizing tape motion over the second module 304.

Depending on tape tension and stiffness, it may be desirable to angle the tape bearing surfaces of the outer modules relative to the tape bearing surface of the second module. FIG. 6 illustrates an embodiment where the modules 302, 304, 306 are in a tangent or nearly tangent (angled) configuration. Particularly, the tape bearing surfaces of the outer modules 302, 306 are about parallel to the tape at the desired wrap angle $\alpha_2$ of the second module 304. In other words, the planes of the tape bearing surfaces 308, 312 of the outer modules 302, 306 are oriented at about the desired wrap angle $\alpha_2$ of the tape 315 relative to the second module 304. The tape will also pop off of the trailing module 306 in this embodiment, thereby reducing wear on the elements in the trailing module 306. These embodiments are particularly useful for write-read-write applications. Additional aspects of these embodiments are similar to those given above.

Typically, the tape wrap angles may be set about midway between the embodiments shown in FIGS. 5 and 6.

Figure 7:
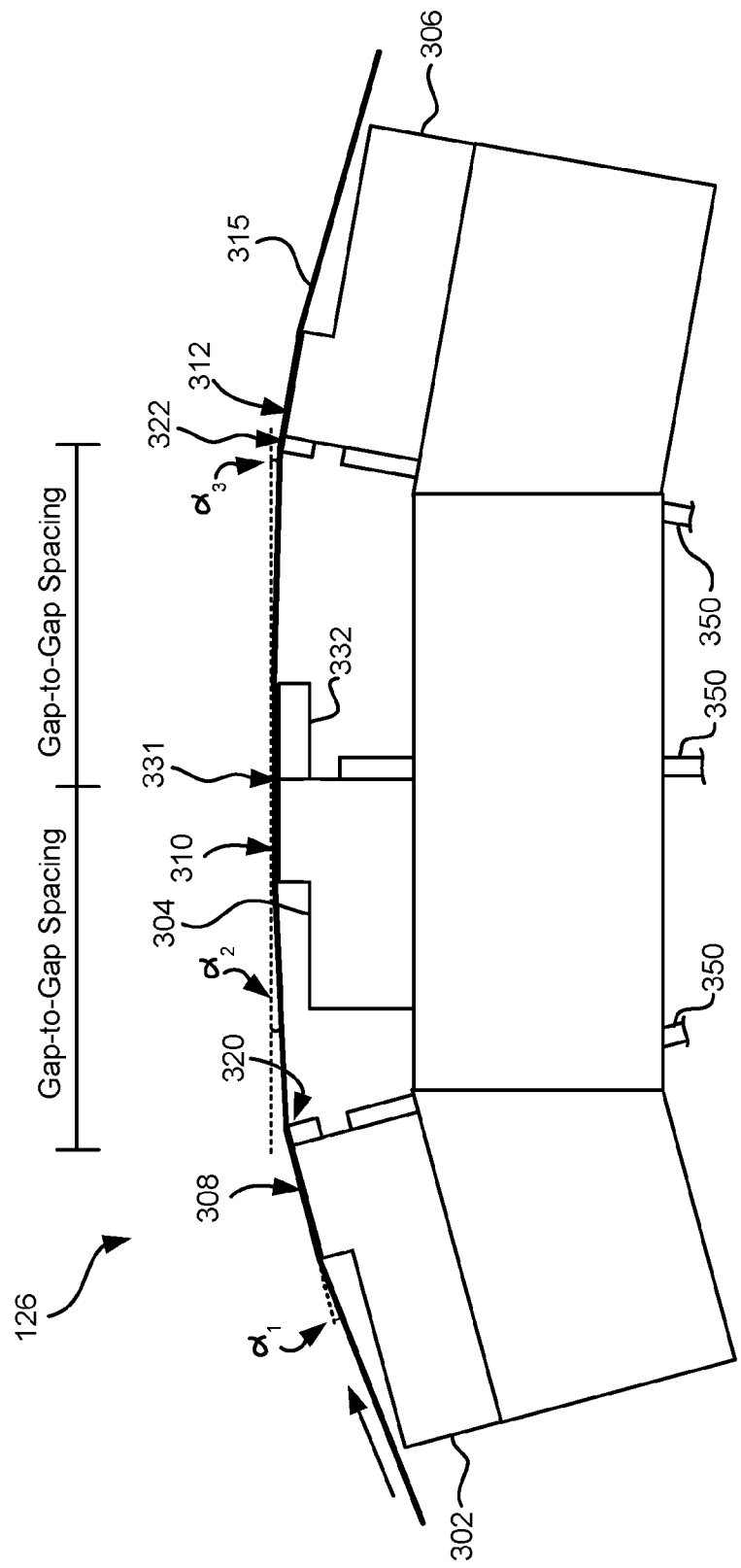
FIG. 7 is a side view of a magnetic tape head with three modules in an overwrap configuration.

FIG. 7 illustrates an embodiment where the modules 302, 304, 306 are in an overwrap configuration. Particularly, the tape bearing surfaces 308, 312 of the outer modules 302, 306 are angled slightly more than the tape 315 when set at the desired wrap angle $\alpha_2$ relative to the second module 304. In this embodiment, the tape does not pop off of the trailing module, allowing it to be used for writing or reading. Accordingly, the leading and middle modules can both perform reading and/or writing functions while the trailing module can read any just-written data. Thus, these embodiments are preferred for write-read-write, read-write-read, and write-write-read applications. In the latter embodiments, closures should be wider than the tape canopies for ensuring read capability. The wider closures will force a wider gap-to-gap separation. Therefore a preferred embodiment has a write-read-write configuration, which may use shortened closures that thus allow closer gap-to-gap separation.

Additional aspects of the embodiments shown in FIGS. 6 and 7 are similar to those given above.

A 32 channel version of a multi-module head 126 may use cables 350 having leads on the same pitch as current 16 channel piggyback LTO modules, or alternatively the connections on the module may be organ-keyboarded for a 50% reduction in cable span. Over-under, writing pair unshielded cables can be used for the writers, which may have integrated servo readers.

The outer wrap angles $\alpha_1$ may be set in the drive, such as by guides of any type known in the art, such as adjustable rollers, slides, etc. For example, rollers having an offset axis may be used to set the wrap angles. The offset axis creates an orbital arc of rotation, allowing precise alignment of the wrap angle $\alpha_1$.

To assemble any of the embodiments described above, conventional u-beam assembly can be used. Accordingly, the mass of the resultant head can be maintained or even reduced relative to heads of previous generations. In other approaches, the modules may be constructed as a unitary body. Those skilled in the art, armed with the present teachings, will appreciate that other known methods of manufacturing such heads may be adapted for use in constructing such heads.

In magnetic head structures, it may be desirable to incorporate sensor protection for a reader transducer. Such protection may involve recessing one or more shields associated with the reader transducer. However, conventional magnetic recording heads that have recessed reader sensors may also have recessed write poles with accordingly reduced writing performance due to spacing loss.

Embodiments of the present invention overcome the aforementioned drawback by providing a magnetic recording head that incorporates recessed reader sensors as well as zero or near-zero recessed write poles. Preferably, the magnetic recording head includes merged or piggybacked read and write transducers that incorporate recessed reader sensors and zero or near-zero recessed write poles. The write poles may only be minimally recessed from the plane extending along the media facing side of the magnetic head to maximize writing efficiency, magnetic recording and data archiving. Additionally, in preferred embodiments, the reader sensor may be more recessed from said plane than the write poles and/or coated with a durable material.

FIG. 8A depicts a magnetic head 800 in accordance with various illustrative embodiments. As an option, the present magnetic head 800 may be implemented in conjunction with features from any other embodiment listed herein, such as those described with reference to the other FIGS. Of course, however, such magnetic head 800 and others presented herein may be used in various applications and/or in permutations, which may or may not be specifically described in the illustrative embodiments listed herein. Further, the magnetic head 800 presented herein may be used in any desired environment.

As shown in FIGS. 8A-8B according to one approach, the magnetic head 800 may include a module 802. In one embodiment, the magnetic head 800 may include a second and/or third module having a configuration similar or identical to the module 802. For example, the magnetic head 800 may be similar to any of the magnetic heads described herein.

In another embodiment, the magnetic head 800 may be configured to operate with tape media. In yet another embodiment, the magnetic head 800 may include a slider that may be used, e.g. with a magnetic disk.

In a further embodiment, the magnetic head may include a closure 804 and a substrate 806. As shown in FIG. 8A, the closure 804 and substrate 806 may define a portion of a media facing side 808 of the module 802.

Additionally, the magnetic head 800 may include one or more read transducers 810 and one or more write transducers 812, as well as conventional layers such as insulating layers, leads, coils, etc. as would be apparent to one skilled in the art upon reading the present description. The one or more read transducers 810 and the one or more write transducers 812 may be positioned towards the media facing side 808 of the module 802, in one approach. In another approach, the one or more read transducers 810 and the one or more write transducers 812 may be sandwiched in a gap portion between the closure 804 and the substrate 806. In yet another approach, the one or more read transducers 810 and the one or more write transducers 812 may be present in an array of transducers extending along the media facing side 808 of the module 802.

The one or more read transducers 810 and the one or more write transducers 812 may be selected from the group consisting of piggyback read-write transducers, merged read-write transducers, and interleaved read and write transducers, according to one embodiment. For example, in one approach the one or more read transducers 810 and the one or more write transducers 812 may be piggyback read-write transducers, such as those depicted in FIG. 2C.

In another approach, as depicted in FIG. 8B, the one or more read transducers 810 and the one or more write transducers 812 may be merged read-write transducers, where an upper sensor shield acts as a pole of the writer as well as a sensor shield.

Figure 8C:
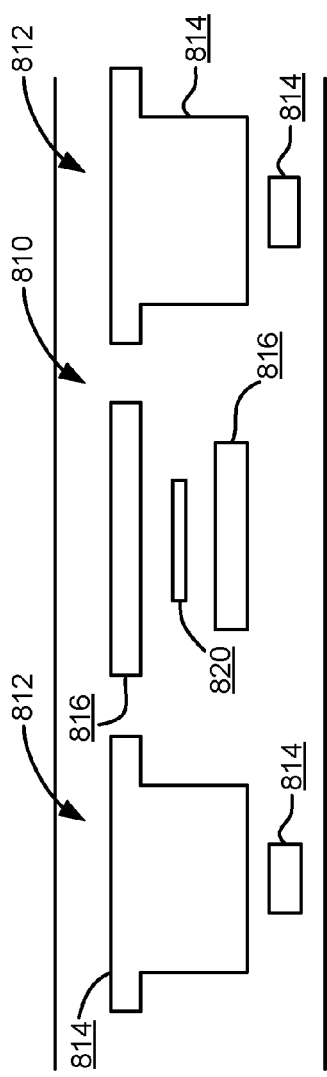
FIG. 8C is a partial side view of a media facing surface of a magnetic head according to one embodiment.

In yet another approach, as depicted in FIG. 8C, the one or more read transducers 810 and the one or more write transducers 812 may be interleaved read and write transducers, where the read and write transducers alternate along the array.

Alternatively, in another embodiment, the magnetic head 800 may include one or more read transducers 810 and one or more write transducers 812 selected from a group consisting of piggyback read-write transducers, and merged read-write transducers.

According to another embodiment, the one or more write transducers 812 may be flanked by servo read transducers, e.g. as in FIG. 2B.

As shown e.g., in FIG. 8A, according to yet another embodiment, the one or more read transducers may each have at least one shield 816 and a sensor 820, and the one or more write transducers 812 may include write poles 814, one or more of which may be a laminate of layers, as shown in FIG. 8A Likewise one or more the shields 816 may be a laminate of layers.

In a further embodiment, the write poles 814 of the one or more write transducers 812 and the at least one shield 816 of each of the one or more read transducers 810 may each comprise nickel and iron. In a preferred embodiment, the write poles 814 each have a higher iron content than the at least one shield 816 of each of the one or more read transducers 810. For instance, in one approach the write poles 814 may comprise 45/55 Ni—Fe. Alternatively, in another embodiment, the write poles 814 and the at least one shield 816 of each of the one or more read transducers 810 may comprise other materials, including, but not limited to, cobalt-zirconium-tantalum (CZT), Al—Fe—Si (Sendust), etc. or other suitable material as would be understood by one having skill in the art upon reading the present disclosure. In yet other embodiments, at least one reader shield may include Sendust, NiFe/Fe, laminated NiFe/Fe or NiFe/Fe (N), etc.

With continued reference to FIG. 8A, the one or more write transducers 812 may include write poles 814 having media facing sides that may be recessed a depth $d_1$ from a plane 822 extending along the media facing side 808 of the module 802, according to one embodiment. In various approaches, it may be favorable to minimize the spacing loss between the one or more write transducers 812 and the media, e.g. tape or disc, in order to maximize the accuracy of the one or more write transducers 812. Accordingly, it may be preferable, in certain approaches, to minimize the recession of the one or more write transducers 812 from the plane 822.

For example, in one approach, the one or more write transducers 812 may include write poles 814 having media facing sides with zero recession from the plane 822, e.g. $d_1=0$. In an another approach, the one or more write transducers 812 may include write poles 814 having media facing sides with near-zero recession from the plane 822. As used herein, near-zero recession is defined as no greater than 7 nm from the plane 822, e.g. $d_1 \le \pm 7$ nm. Note that a negative recession may refer to a protrusion above the plane.

In a preferred embodiment, the media facing sides of the write poles 814 may be recessed between 0 and ±7 nm from the plane, e.g. $0 \le d_1 \le \pm 7$ nm.

Again with reference to FIG. 8A, the media facing side of the at least one shield 816 of the one or more read transducers 810 may be recessed a depth $d_2$ from the plane 822, in accordance with one embodiment. In some approaches, the recession of the at least one shield 816 of the one or more read transducers 810 may be favorable to protect the read sensor 820 from wear.

For instance, in one approach, the media facing side of the at least one shield 816 of the one or more read transducers 810 may be recessed greater than or equal to 5 nm, from the plane 822, e.g. $d_2 \ge 5$ nm, and in all cases $d_2$ is greater than $d_1$. In another approach, the media facing side of the at least one shield 816 of the one or more read transducers 810 may be recessed greater than or equal to 6 nm (e.g. $d_2 \ge 6$ nm), 8 nm (e.g. $d_2 \ge 8$ nm), 10 nm (e.g. $d_2 \ge 10$ nm), 15 nm (e.g. $d_2 \ge 15$ nm), etc., from the plane 822.

Figure 9:
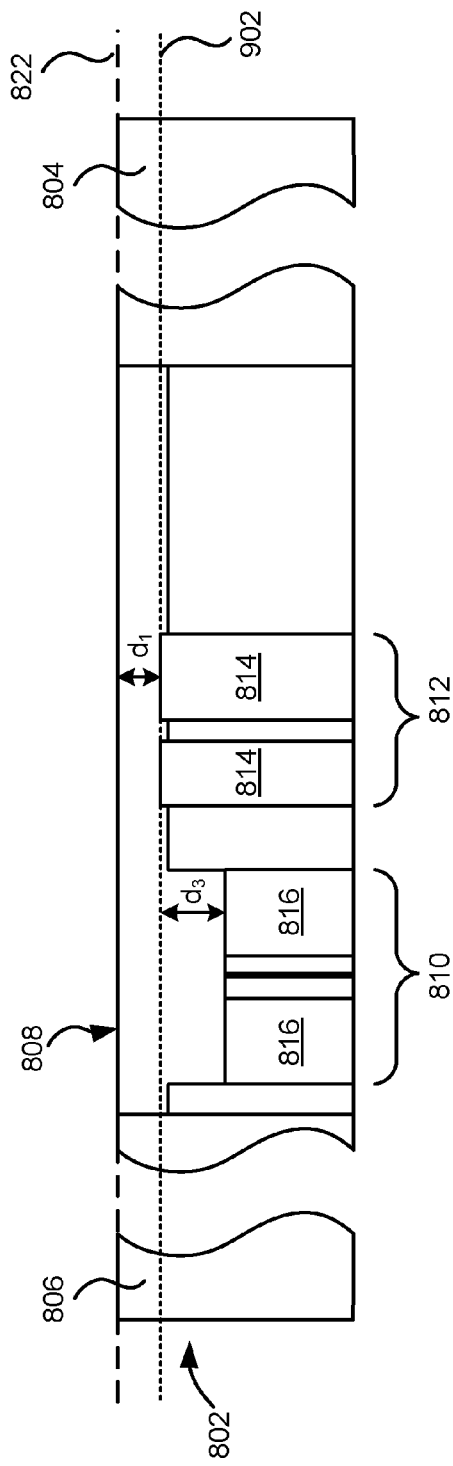
FIG. 9 partial cross-sectional view of a magnetic head according to one embodiment.

In a preferred embodiment, the media facing side of the at least one shield 816 of the one or more read transducers 810 may be more recessed from the plane 822 than the write poles 814. For example, the media facing side of the at least one shield 816 of the one or more read transducers 810 may be recessed at least 5 nm, and preferable at least 10 nm, more than the media facing sides of the write poles 814. In one approach, the media facing side of the at least one shield 816 of the one or more read transducers 810 may be recessed a depth $d_3$ from a plane 902 extending along the media facing sides of the write poles 814, as shown in FIG. 9 according to another illustrative embodiment. The write poles 814 have near zero recession.

In addition, as used herein, the write poles 814 of the one or more write transducers 812 and the at least one shield 816 of the one or more read transducers 810 may be recessed by various processes including, but not limited to, milling, sputtering, masking, etching, etc. or any other suitable process that would be understood by one having skill in the art upon reading the present disclosure. In one exemplary approach, rastered milling may be used. In another illustrative approach, laser ablation may be used. In a further illustrative approach, a portion of the structure may be masked and an exposed portion milled, etched, etc.

Figure 10:
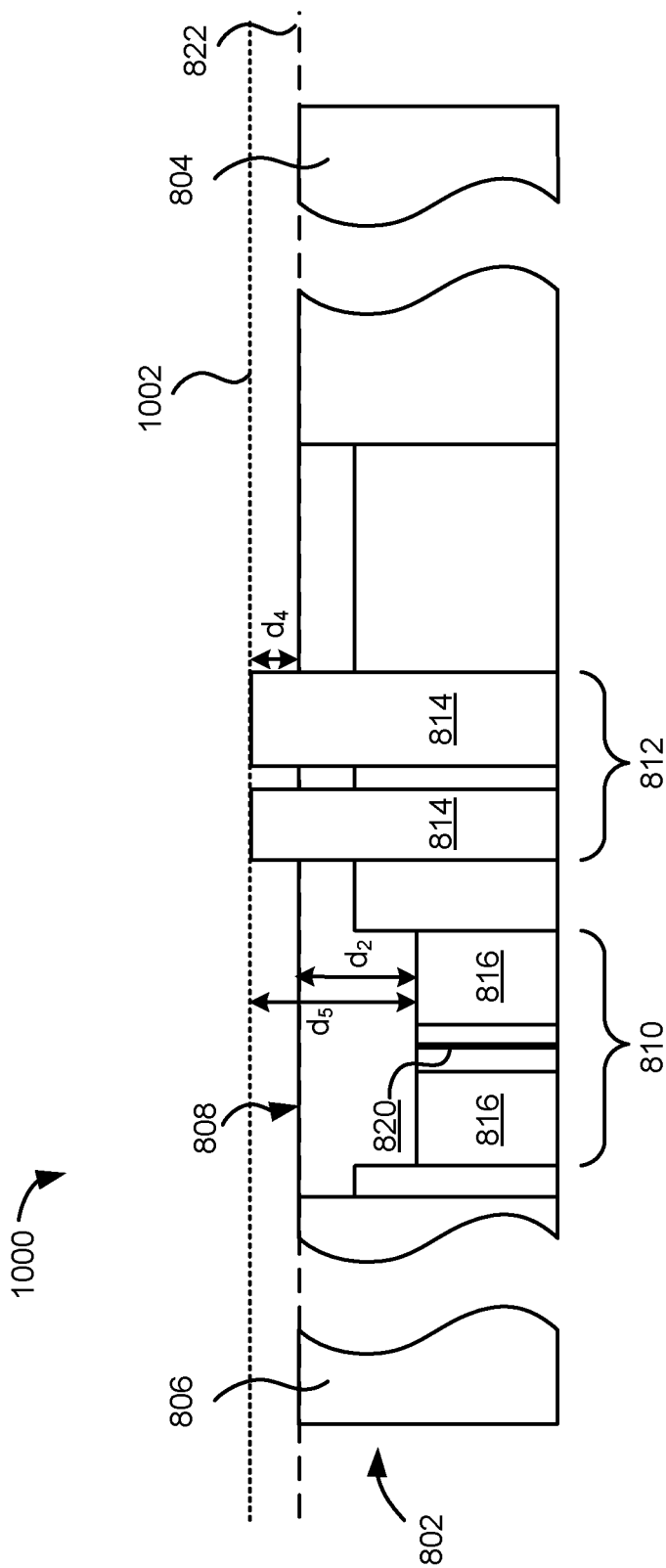
FIG. 10 partial cross-sectional view of a magnetic head according to one embodiment.
Figure 11:
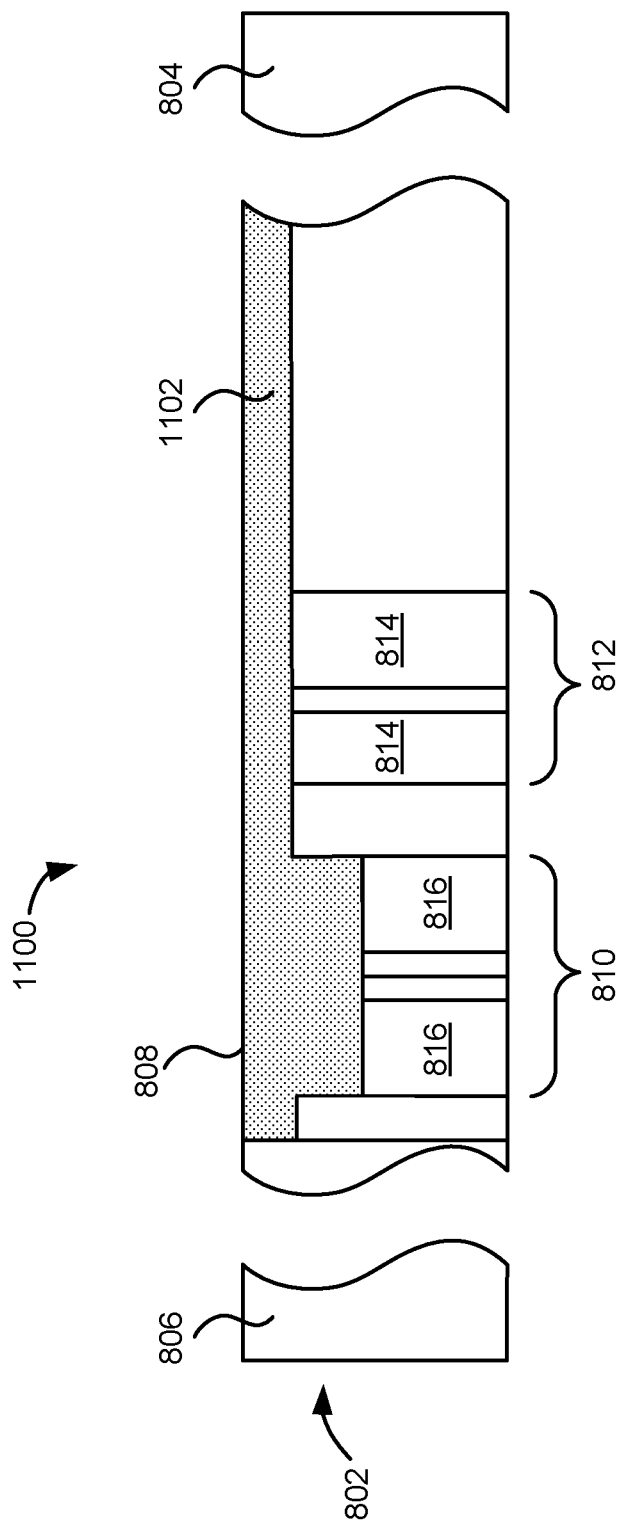
FIG. 11 is partial cross-sectional view of a magnetic head according to one embodiment

Referring now to FIGS. 10-11, a magnetic head 1000 is depicted in accordance with various embodiments. As an option, the present magnetic head 1000 may be implemented in conjunction with features from any other embodiment listed herein, such as those described with reference to the other FIGS. Of course, however, such magnetic head 1000 and others presented herein may be used in various applications and/or in permutations, which may or may not be specifically described in the illustrative embodiments listed herein. Further, the magnetic head 1000 presented herein may be used in any desired environment.

As shown in FIG. 10 according to one approach, the magnetic head 1000 may include one or more write transducers 812, which in turn may include one or more write poles 814 having media facing sides with negative recession from a plane 822 extending along the media facing side 808 of the module 802. As used herein, negative recession is defined as a protrusion from the plane 822.

For example, in one embodiment, the media facing sides of the write poles 814 may protrude a distance $d_4$ above the plane 822. In another embodiment, $d_4$ may be zero. In yet another embodiment, $d_4$ may be less than or equal to 7 nm (corresponding to a negative recession of up to 7 nm). In a preferred embodiment, $d_4$ may be between zero and 5 nm (corresponding to a negative recession of up to 5 nm).

With continued reference to FIG. 10, the media facing side of the at least one shield 816 of the one or more read transducers 810 may be recessed a depth $d_2$ from the plane 822 extending along the media facing side 808 of the module 802, in one approach. In the alternative, the media facing side of the at least one shield 816 of the one or more read transducers 810 may be recessed a depth $d_5$ from a plane 1002 extending along the media facing sides of the write poles 814, as shown in FIG. 10 according to another illustrative approach.

Referring now to FIG. 11, a magnetic head 1100 is shown in accordance with one illustrative embodiment. As an option, the present magnetic head 1100 may be implemented in conjunction with features from any other embodiment listed herein, such as those described with reference to the other FIGS. Of course, however, such magnetic head 1100 and others presented herein may be used in various applications and/or in permutations, which may or may not be specifically described in the illustrative embodiments listed herein. Further, the magnetic head 1100 presented herein may be used in any desired environment.

As shown in FIG. 11 according to one approach, the magnetic head 1100 may include a coating 1102 on the media facing side 808 of the module 802 adjacent the one or more read transducers 810. In some approaches, the coating may serve to protect the one or more read transducers 810. In other embodiments, the coating may serve to protect from wear induced by the magnetic medium.

Additionally, in one embodiment, the coating may have any shape, orientation, etc. depending on the desired embodiment. For example, the coating 1102 may overlie the associated read or write transducer, e.g., as a full film, etc.; may surround the transducer, e.g., in a donut shape; may be present in a strip or a stripe in front of, on top of, and/or behind the associated transducer in the direction of media travel thereacross; may sandwich the associated transducer laterally; etc., and combinations thereof. In another embodiment, the coating 1102 may be applied by a know means such as sputtering.

In yet another embodiment, the coating 1102 may comprise an insulating material, a dielectric material, or other suitable known material as would be apparent to one having skill in the art upon reading the present disclosure. Nonlimiting examples include alumina, diamond-like carbon (DLC), chrome oxide, nickel-chrome oxide, etc.

According to a further illustrative embodiment, a data storage system may include a magnetic head according to any of the approaches described and/or suggested herein. The data storage system may additionally include a drive mechanism for passing a magnetic medium over the magnetic head.

Furthermore, the data storage system may include a controller electrically coupled to the magnetic head. According to various approaches, the controller may be electrically coupled to the magnetic head via a wire, a cable, wirelessly, etc.

It will be clear that the various features of the foregoing methodologies may be combined in any way, creating a plurality of combinations from the descriptions presented above.

While various embodiments have been described above, it should be understood that they have been presented by way of example only, and not limitation. Thus, the breadth and scope of an embodiment of the present invention should not be limited by any of the above-described exemplary embodiments, but should be defined only in accordance with the following claims and their equivalents.

What is claimed is:

1. An apparatus, comprising:
a module having a substrate, read and write transducers positioned toward a media facing side of the module, and a closure,
wherein the write transducers include write poles having media facing sides with zero or near zero recession from a plane extending along a media facing side of the substrate of the module;
wherein the read transducers each have two shields, wherein media facing sides of the shields are more recessed from the plane than the write poles;
wherein the media facing sides of the shields are recessed a same amount from the plane.

2. An apparatus as recited in claim 1, comprising a coating on the media facing side of the module adjacent the read transducers.

3. An apparatus as recited in claim 1, wherein the media facing sides of the write poles are recessed from the plane extending along the media facing side of the substrate of the module by a distance in a range from greater than 0 to 7 nm.

4. An apparatus as recited in claim 1, wherein the write poles of the write transducers and the shields of each of the read transducers each comprise nickel and iron, wherein the write poles each have a higher iron content than the shields of each of the read transducers.

5. An apparatus as recited in claim 1, wherein the two shields of each of the read transducers are formed of a same material.

6. An apparatus as recited in claim 1, comprising a second module having a configuration similar or identical to the module, the modules being configured to operate with tape media.

7. An apparatus as recited in claim 1, wherein the module is a slider.

8. An apparatus as recited in claim 1, wherein the module further includes the closure defining a portion of the media facing side of the module, wherein the closure and the substrate sandwich the read and write transducers therebetween.

9. An apparatus as recited in claim 8, wherein a media facing side of the closure and the media facing side of the substrate extend along a common plane.

10. An apparatus as recited in claim 1, comprising: a drive mechanism for passing a magnetic medium over the module; and a controller electrically coupled to the module.

11. An apparatus, comprising:
a substrate having a media facing side; and
an array of read and write transducers,
wherein the write transducers include write poles having media facing sides,
wherein the read transducers each have two shields, wherein media facing sides of the shields are recessed a same amount from a plane extending along the media facing side of the substrate,
wherein the media facing sides of the write poles are in the plane or recessed from the plane,
wherein the media facing sides of the shields are more recessed from the plane than the media facing sides of the write poles.

12. An apparatus as recited in claim 11, wherein the media facing sides of the write poles are recessed from greater than 0 to 7 nm from the plane.

13. An apparatus as recited in claim 11, wherein the media facing sides of the write poles are in the plane.

14. An apparatus as recited in claim 11, comprising: a drive mechanism for passing a magnetic medium over the transducers; and a controller electrically coupled to the transducers.

* * * * *